No. 853,439. PATENTED MAY 14, 1907.
A. C. CLARK.
INHALER.
APPLICATION FILED OCT. 14, 1903.
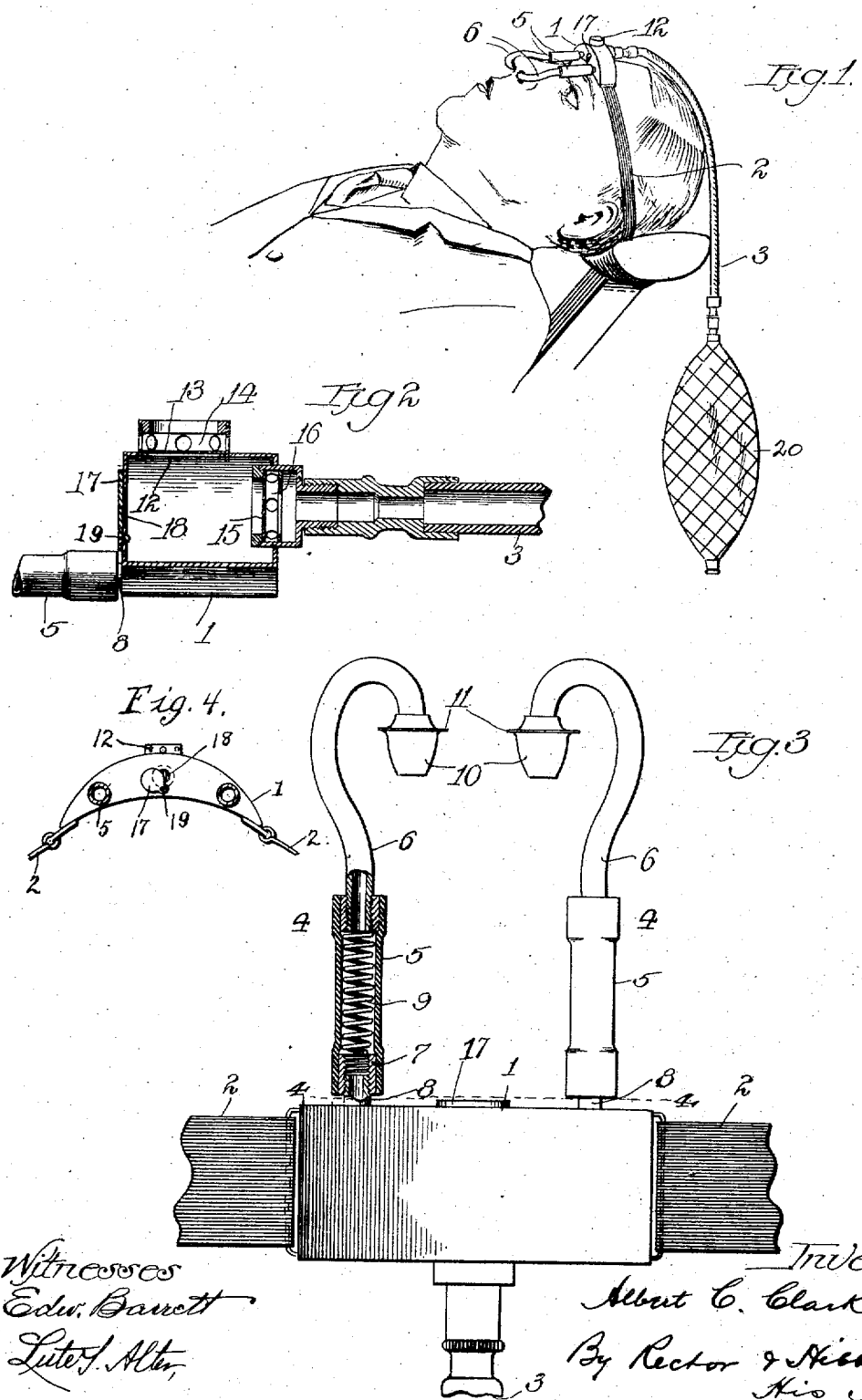

UNITED STATES PATENT OFFICE.

ALBERT C. CLARK, OF CHICAGO, ILLINOIS.

INHALER.

No. 853,439.  Specification of Letters Patent.  Patented May 14, 1907.

Application filed October 14, 1903. Serial No. 176,952.

*To all whom it may concern:*

Be it known that I, ALBERT C. CLARK, residing at Chicago, Cook county, Illinois, have invented certain new and useful Improvements in Inhalers, of which the following is a specification.

My invention relates to inhalers for administering anesthetics and the like, such as the nitrous-oxid gas used in dental operations, although the inhaler is capable of administering any anesthetic, as well as gases generally, even oxygen.

The object of my invention is to provide a simple and efficient device of this character, whose features of advantage and utility will be apparent from the description hereinafter given.

In the drawings, Figure 1 is a perspective view of my apparatus or inhaler shown applied to a patient; Fig. 2 a sectional view thereof, Fig. 3 a bottom view of the inhaler with one of the inhaler tubes shown in section; and Fig. 4 a sectional elevation on line 4—4 of Fig. 3.

My device comprises essentially a casing arranged to be attached to the head of the patient in suitable manner and provided with two depending inhaling tubes to be inserted in the nasal passages. The casing 1, above mentioned, may be made of suitable material, sheet metal, hard rubber or the like, and in the present instance the same is somewhat crescent shaped so as to fit the curvature of the patient's forehead. To attach the casing to the head, an elastic band 2 is secured at the ends or tips of such casing, but to adjust the length of the band, the same may be made in two pieces held adjustably by a buckle or the like, as usual in head bands for other purposes.

The casing is connected in suitable manner to a source of supply of gas or other anesthetic or the like, as by means of the flexible tube or pipe 3.

Two separate inhaling tubes depend from the casing and communicate therewith, and of course with the gas supply, whereby the gas is conducted to the nasal passages of the patient. In the present instance each inhaling tube comprises a flexible rubber pipe 5, connected at one end with the casing and having at its other end a stiff pipe or tube 6 with its free end extended upwardly. The inner end of each rubber pipe 5 slips upon a screw threaded sleeve 7, which in turn fits or screws upon a nozzle 8 projecting from and communicating with the casing 1, there being two of such nozzles, one for each inhaling tube. Each tube is provided with a coiled spring 9 fitted inside the rubber pipe and preferably attached to the sleeve whereby the inhaling tubes can be readily adjusted to the nasal passages. The free end of each inhaling tube is provided with a tip 10 of rubber or the like and of a size and shape to fit the nasal passages, and in order to close all passage around the tip when inserted in the nose and thereby prevent inhalation of air, the tip may be provided with a suitable circumferential flange 11 of the same material as the tip or not, as desired, and also separate or integral therewith. Moreover, the flange may be flexible like soft rubber, if desired.

At any suitable point in the casing an exhaling port or opening 12 is provided, the same being controlled by a suitable check valve, which, in the present instance, is an ordinary disk 13 freely movable in a cage 14 secured over said port 12. At the time of inhalation, this check valve closes the port 12, but in exhalation the same opens the port.

The gas inlet into the casing from the gas supply is provided with a check valve 15 working in a cage 16 and arranged to open during inhalation but to close during exhalation.

This inhaler is particularly adapted to dental purposes and the construction and arrangement is such that the same can be readily applied and left in position, during the dental operation, whether the extracting or filling of teeth, with the result that in event additional gas is required to complete the operation, the same may be administered by simply opening a gas supply valve (not shown). In case it is desired to permit the patient to inhale pure air after the gas has been shut off, or to inhale the gas diluted with air, the casing may be provided with a suitable valve-governed opening, and in the present instance I have shown for this purpose a disk 17 pivoted at 19 to the bottom of the casing on the nozzle side thereof and adapted to control an opening 18 communicating between the interior of the casing and the atmosphere. The patient may be thus given pure air, or diluted gas, without removing the inhaling tubes. The provision of the separate tubes affords considerable advantage over the hood type of inhalers, in that the device is more compact and does not interfere with the operator's work, besides being more agreeable to the patient. Moreover, leakage of gas around the inhalers, which is objectionable with the hood type, is impossible in my construction of inhaler. Furthermore, my inhaler is more cleanly in view of the fact that the tips can be easily removed and sterilized at each use of the apparatus. A bag 20 may, if desired, be used intermediate the gas supply and inhaler, as shown in Fig. 1 of the drawings.

I claim:

1. An inhaler comprising a casing adapted to be connected with a source of anesthetic or the like and arranged to be supported on the patient's forehead, and a pair of inhaling tubes communicating with the casing and arranged to be adjusted as to their tips with respect to the casing whereby such tips may be adjusted to and inserted in the nasal passages of the patient.

2. An inhaler comprising a casing adapted to be connected with a source of anesthetic or the like and arranged to fit and be supported upon the patient's forehead, an elastic head-band connected to the casing for holding the same in position, and a pair of tubes communicating with the casing for inhalation and exhalation, said tubes having a movement independent of the casing whereby the same may be adjusted to and inserted in the nasal passages of the patient.

3. An inhaler comprising a casing adapted to communicate with a source of anesthetic or the like, and a pair of inhaling tubes depending from and communicating with the casing and terminating in hook-shaped nozzles or tips adapted to be inserted in the nasal passages of the patient, said tubes being flexible and having a movement at their tips independent of the casing whereby such tips may be readily adjusted to and inserted in the nasal passages.

4. An inhaler comprising a casing adapted to communicate with a source of anesthetic or the like, and a pair of inhaling tubes depending from and communicating with the casing and terminating in hook-shaped nozzles or tips adapted to be inserted in the nasal passages of the patient, said tubes being flexible and having a movement at their tips independent of the casing whereby such tips may be readily adjusted to and inserted in the nasal passages, the tips being enlarged with respect to the body of the tubes.

5. An inhaler comprising a casing adapted to communicate with a source of anesthetic or the like and arranged to be supported on the patient's forehead, and a pair of separate inhaling tubes communicating independently with the casing and terminating in removable tips for insertion in the nasal passages of the patient.

6. An inhaler comprising a casing adapted to be connected with a source of anesthetic or the like, and a pair of inhaling tubes communicating with the casing and arranged to be adjusted as to their tips with respect to the casing whereby such tips may be adjusted to and inserted in the nasal passages of the patient, said tips having flexible flanges at their inner ends to seal the nostrils and prevent entrance of air.

7. An inhaler comprising a casing adapted to be connected with a source of anesthetic or the like, and a pair of inhaling tubes communicating with the casing and having enlarged removable tips provided with integral flexible flanges to seal the nostrils and prevent the entrance of air, said tubes being arranged to be adjusted as to their tips with respect to the casing whereby such tips may be adjusted to and inserted in the nasal passages of the patient.

8. An inhaler comprising a casing adapted to communicate with a source of supply of anesthetic or the like, a pair of inhaling tubes communicating with the casing and arranged to be inserted in the nasal passages of the patient, and flexible coiled springs coöperating with the tubes.

9. An inhaler comprising a casing adapted to communicate with a source of supply of anesthetic or the like, said casing having a valve-governed exhalation outlet, and a pair of flexible inhaling tubes communicating with and depending from the casing and arranged to be inserted in the patient's nose.

10. An inhaler comprising a casing adapted to communicate with a source of supply of anesthetic or the like, an exhalation valve in said casing, means for admitting pure air into the casing at the will of the operator, and a pair of inhaling tubes depending from the casing.

11. An inhaler comprising a casing adapted to communicate with a source of supply of anesthetic or the like, said casing having an air opening, a manually operated valve to govern such opening, and a pair of inhaling tubes depending from the casing.

12. An inhaler comprising a casing adapted to communicate with a source of supply of anesthetic or the like and arranged to be supported on the patient's forehead, two removable nozzles secured to the casing, and a pair of flexible inhaling tubes connected with the nozzles.

13. An inhaler comprising a casing adapted to communicate with a source of supply of anesthetic or the like, two nozzles secured to the casing, and a pair of inhaling tubes, each tube comprising a flexible section or tube proper, a sleeve fitting in the inner end and secured to the nozzle, and an inflexible tube fitting in the outer end of the flexible tube or section and upwardly turned at its outer end.

14. An inhaler comprising a casing adapted to communicate with a source of supply of anesthetic or the like, two nozzles secured to the casing, and a pair of inhaling tubes, each tube comprising a flexible section or tube proper, a sleeve fitting in the inner end and secured to the nozzle, a coiled spring within the flexible tube, and an inflexible tube fitting in the outer end of the flexible tube or section and upwardly turned at its outer end.

15. An inhaler comprising a casing adapted to communicate with a source of supply of anesthetic or the like, said casing being curved on its inner side to fit upon the forehead of the patient, and a pair of inhaling tubes communicating with and depending from the casing and having hook-shaped ends for insertion in the patient's nostrils.

16. An inhaler comprising a casing adapted to communicate with a source of supply of anesthetic or the like, said casing being substantially crescent shaped, and adapted to fit upon the patient's forehead, a head band secured to the tips of the casing, and a pair of flexible inhaling tubes communicating with and depending from the casing.

17. An inhaler comprising a casing adapted to communicate with a source of anesthetic or the like and arranged to be supported on the patient's forehead, and a pair of independently adjustable inhaling tubes communicating with the casing and adapted to be inserted in the nasal passages of the patient.

18. An inhaler comprising a casing adapted to communicate with a source of anesthetic or the like and arranged to be supported on the patient's forehead, and a pair of flexible inhaling tubes communicating with the casing and adjustable with respect thereto and adapted to be inserted in the nasal passages of the patient.

19. An inhaler comprising a casing adapted to communicate with a source of anesthetic or the like, a check valve in said casing to provide for exhalation through such casing, and flexible inhaling tubes adapted to communicate between the casing and patient's nose.

20. An inhaler comprising a casing adapted to communicate with a source of anesthetic or the like, a check valve in said casing opening to supply the anesthetic to the casing, a second check valve in said casing opening to exhaust exhalation from the casing, and inhaling tubes capable of adjustment with respect to the casing and adapted to be inserted in the patient's nostrils.

21. An inhaler comprising a rigid casing, and a pair of flexible inhaling tubes connected therewith and depending therefrom said tubes having up-turned ends arranged to be inserted in the patient's nostrils.

22. An inhaler comprising a casing, and a pair of inhaling tubes connected therewith, each tube comprising a hook-shaped rigid portion and a flexible portion.

ALBERT C. CLARK.

Witnesses:
LOUIS B. ERWIN,
S. E. HIBBEN.